Inventor:
James L. A. McLaughlin,
By Chritton, Schroeder, Merriam & Hofgren,
Attys.

SINGLE-SIDEBAND RADIO EQUIPMENT

Filed Feb. 28, 1948

4 Sheets-Sheet 2

Inventor:
James L. A. McLaughlin,
By Chritton, Schroeder, Merriam & Hofgren,
Attys.

July 21, 1953 J. L. A. McLAUGHLIN 2,646,499

SINGLE-SIDEBAND RADIO EQUIPMENT

Filed Feb. 28, 1948 4 Sheets-Sheet 3

Inventor:
James L. A. McLaughlin,
By Christon, Schroeder, Merriam & Hofgren,
Attys.

July 21, 1953 J. L. A. McLAUGHLIN 2,646,499

SINGLE-SIDEBAND RADIO EQUIPMENT

Filed Feb. 28, 1948

4 Sheets-Sheet 4

Inventor:
James L. A. McLaughlin,
By Chritton, Schroeder, Merriam & Hofgren,
Attys.

Patented July 21, 1953 2,646,499

UNITED STATES PATENT OFFICE 2,646,499

SINGLE-SIDEBAND RADIO EQUIPMENT

James L. A. McLaughlin, La Jolla, Calif.

Application February 28, 1948, Serial No. 11,925

2 Claims. (Cl. 250—20)

This invention relates to single sideband radio equipment, and more particularly to selectable single sideband radio equipment wherein switching from one sideband to the other is accomplished as a function of the operation of the radio tuning means.

One feature of this invention is that it provides improved single sideband radio equipment; another feature of this invention is that it provides selectable single sideband radio equipment wherein switching from one sideband to the other is accomplished as a function of the operation of the radio tuning means; a further feature of the invention is that it provides a single sideband radio receiver which has an actual selectivity comparable to the relatively broad selectivity of a double sideband receiver; yet another feature of this invention is that it provides a single sideband radio receiver which has a very narrow apparent selectivity permitting very accurate tuning; still a further feature of this invention is that it provides a single sideband radio receiver which may be arranged to have a broad apparent selectivity comparable to the relatively broad selectivity of a double sideband receiver.

Figures 1, 2:
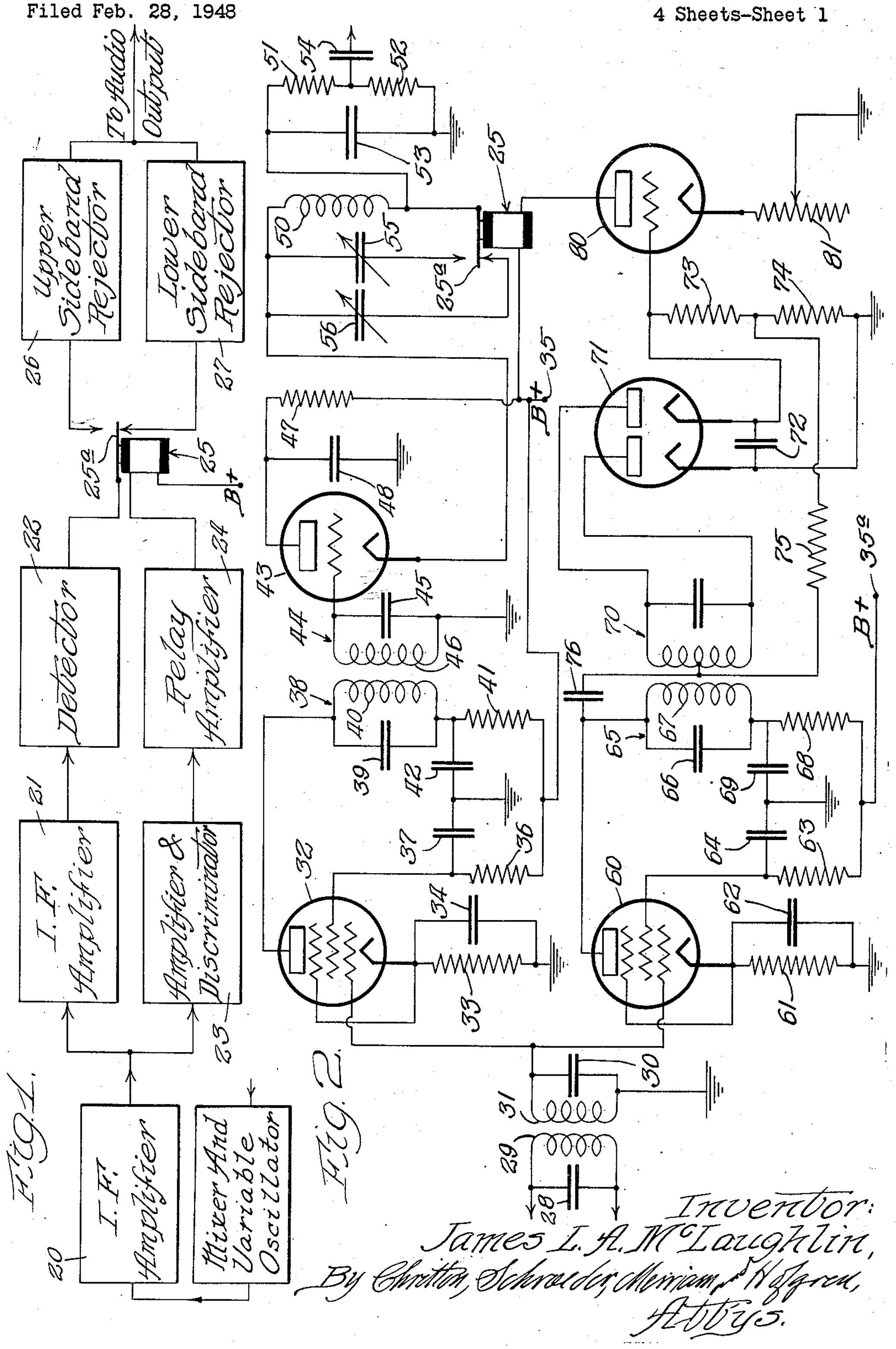
Figure 3:
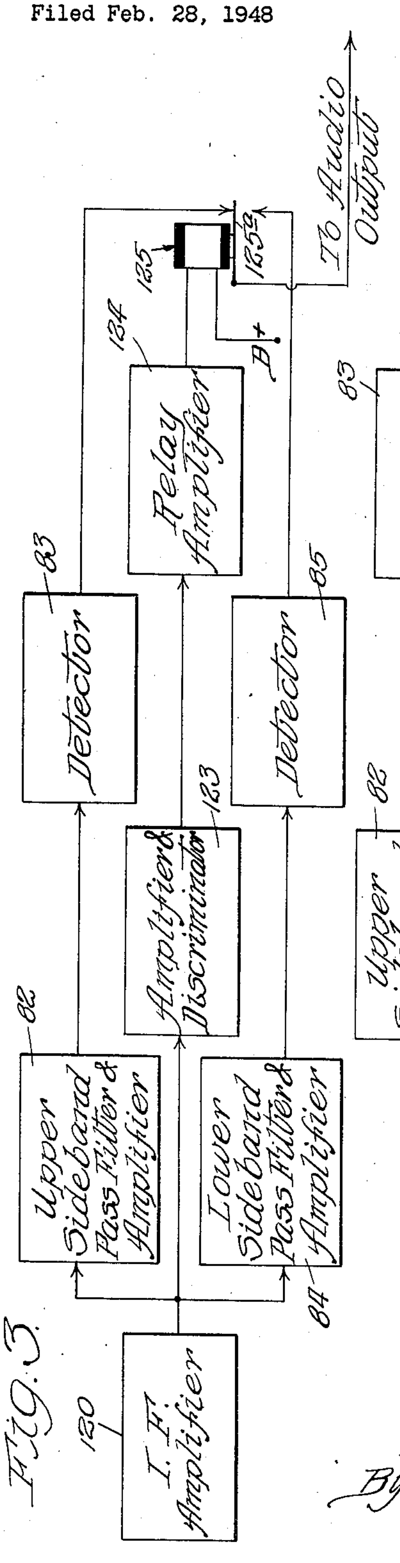
Figure 4:
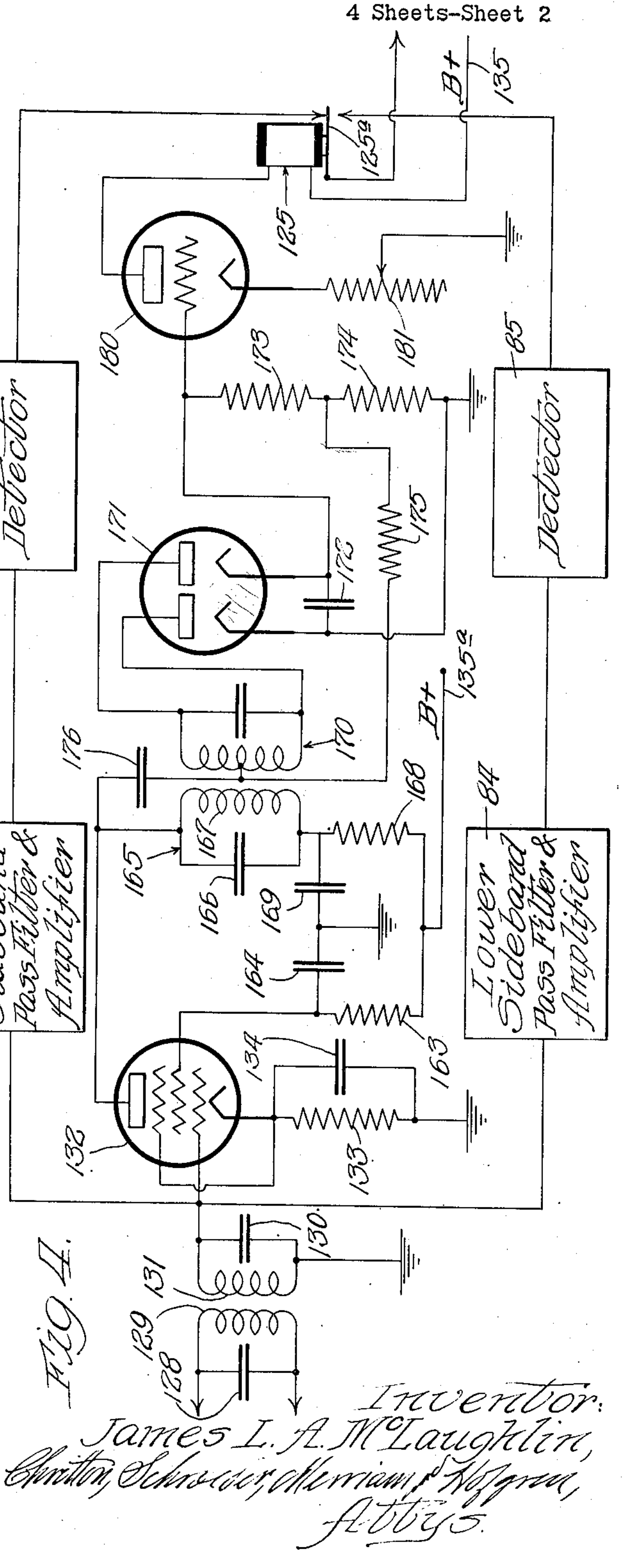
Figures 5, 6, 7, 8, 9:
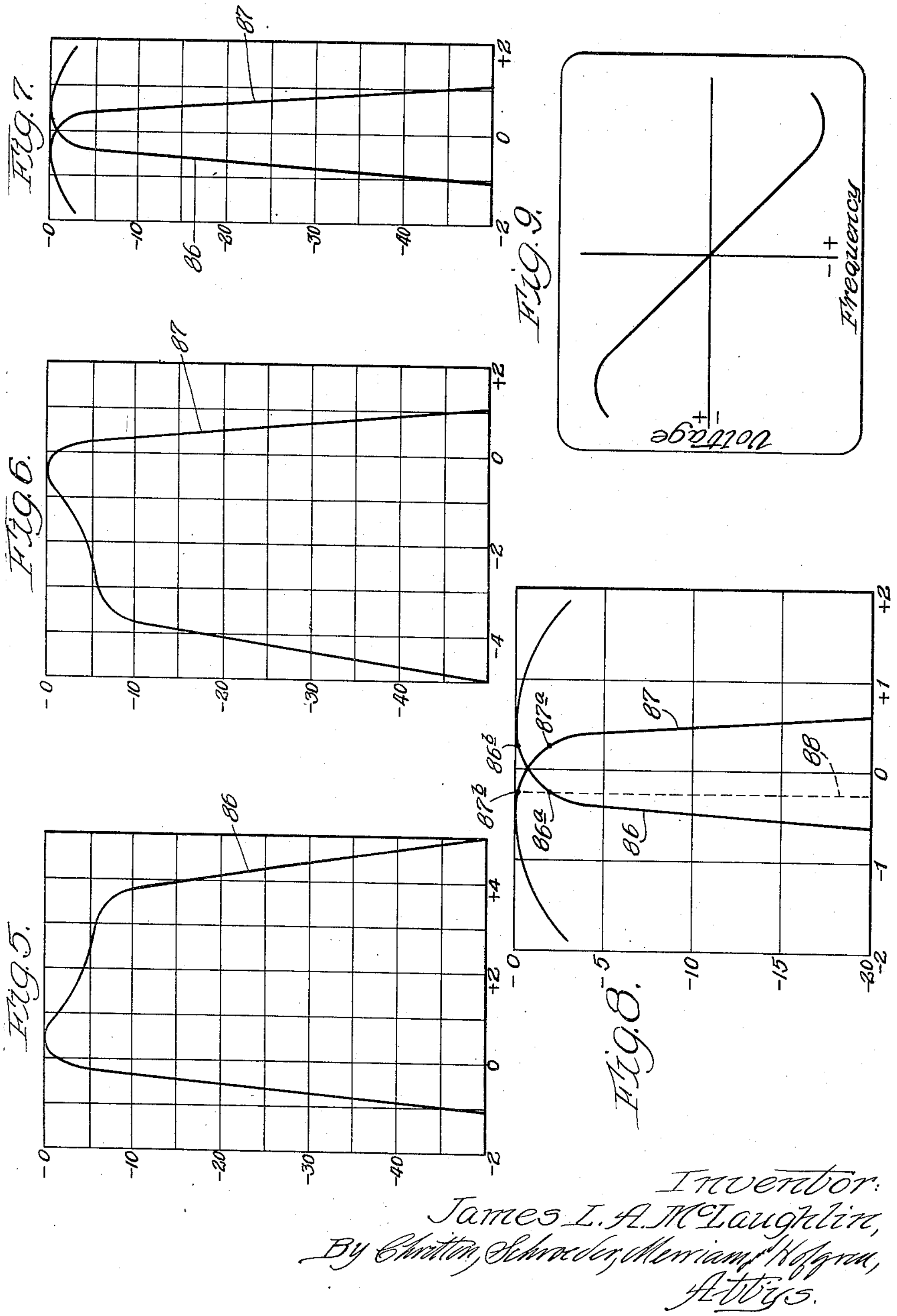
Figures 10, 11, 12:
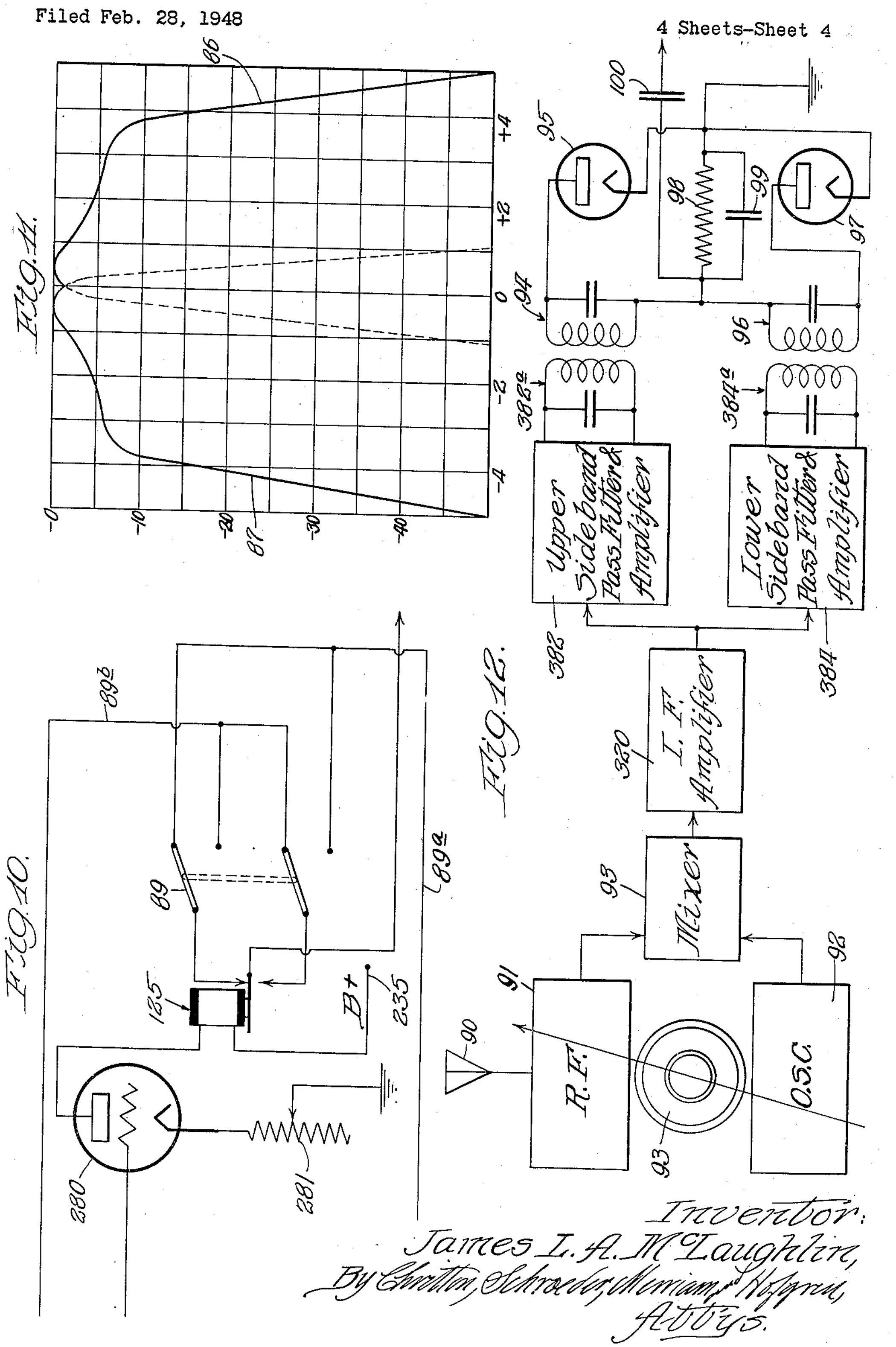

Further features and advantages of this invention will be apparent from the following specification and from the drawings, in which: Fig. 1 is a block diagram of a preferred form of single sideband radio equipment constructed in accordance with this invention; Fig. 2 is a schematic diagram of the apparatus shown in Fig. 1; Fig. 3 is a block diagram of another form of single sideband radio equipment constructed in accordance with this invention; Fig. 4 is a diagram partly in block form and partly schematic of the apparatus shown in Fig. 3; Fig. 5 is a diagram illustrating the response curve of a portion of the apparatus of Figs. 3 and 4; Fig. 6 is a graph illustrating the response curve of another portion of the apparatus shown in Figs. 3 and 4; Fig. 7 is a graph illustrating the apparent selectivity of a single sideband radio receiver constructed in accordance with this invention; Fig. 8 is an enlarged graph of a portion of the graph of Fig. 7; Fig. 9 is a voltage-frequency curve of a frequency discriminator such as may form part of the apparatus of Fig. 4; Fig. 10 is a fragmentary schematic diagram showing a reversing arrangement for changing the apparent selectivity characteristics of single sideband radio apparatus constructed in accordance with this invention; Fig. 11 is a graph illustrating the apparent selectivity resulting from the use of the apparatus of Fig. 10; and Fig. 12 is a diagram partly in block form and partly schematic of another form of this invention.

A radio signal normally comprises three component parts—a carrier or signal wave of fixed frequency and two sidebands of varying widths created by modulation of the carrier wave with the intelligence which it is desired to transmit. Receiving apparatus can, of course, be designed with almost any desired amount of selectivity, but making the circuits too selective results in chopping off the outer edges of the sidebands and losing part of the transmitted intelligence. Accordingly, the usual radio receiver is provided with relatively broad selectivity characteristics, usually being designed to receive a band of frequencies of about ten kilocycles width designed to include the carrier wave and two sidebands extending out to about 5,000 cycles on each side of the carrier wave. An even wider reception band is required for high fidelity reproduction; and anything narrower than about 6,000 cycles (in a double sideband receiver) not only loses the higher notes of music, but even tends to make speech unintelligible.

It will be understood that the above discussion is directed to the type of amplitude modulation now generally used, and my invention will be described in connection with such an amplitude modulation system. It will be understood, however, that my invention will also find use with very wide band frequency modulated signals, as the principles are the same in each case. It is thought that it would unduly complicate the disclosure of my invention if an effort were made to describe it with every possible system of transmission and reception.

It has long been known that all of the desired intelligence can be derived from a single sideband, and single sideband transmission and reception have been used in certain specialized phases of radio work, such as transoceanic radio and telephony. Single sideband reception is advantageous in many respects; principally, since as a single sideband receiver utilizes only half the band width required for equal results in a double sideband receiver, the noise level of the single sideband is only half as great in total amplitude as is the noise level of two sidebands. Furthermore, since the band width is only half as great as the width of a double sideband, the likelihood of interfering signals being present is only half as great. As disclosed in my Patent No. 2,264,863, issued December 12, 1944, and in my application entitled "Automatic Heterodyne Eliminator," filed August 5, 1946, Serial No. 688,403, Patent No. 2,480,870 issued September 6, 1949, under certain conditions selection of one sideband and elimination of the other sideband will entirely remove any interfering signals which may appear closely adjacent the desired signal.

However, in the past, single sideband radio equipment has had certain disadvantages partly in that the selectivity of such equipment has been so great that operation by unskilled persons has been impractical. I have devised and am herewith disclosing and claiming apparatus which retains all the advantages of single sideband reception and which eliminates the disadvantages which formerly have been present in providing a relatively broad actual selectivity while at the same time providing a very narrow apparent selectivity. In addition, if broad tuning is desired, I provide a manually operable switch arrangement which provides an apparent selectivity comparable to the relatively broad selectivity of a double sideband receiver.

In the apparatus illustrated in Fig. 1 it will be understood that the signal delivered to the intermediate frequency amplifier designated at 20 is a signal which has been converted from a transmitted radio frequency to a conventional intermediate frequency. That is, the apparatus disclosed in Fig. 1 would be preceded by a conventional tunable radio frequency amplifier, a local heterodyning oscillator and a mixer so that the radio frequency signal would be converted to a frequency intended for usual intermediate frequency use, as 455 kc. per second. This conventional super-heterodyne arrangement is illustrated in Fig. 12, but since such an arrangement is conventional and is thoroughly understood in art, the heterodyning arrangement has been omitted from Figs. 1, 2, 3, and 4. Also, after detection, the audio signal is delivered to a conventional audio output circuit which may include one or more stages of audio amplification and an output device as a speaker or headset. Again the details of such an audio output circuit are conconventional and are thoroughly understood in the art and have not been shown in detail in the drawings.

As is well understood in the art, the converted signal voltage output of the intermediate frequency amplifier 20 varies in frequency as a function of the operation of the tuning means of the receiver, said signal voltage being at the desired intermediate frequency (455 kc. in the example given) only when the receiver is correctly tuned to the incoming transmitted signal. For example, it is common practice to operate the tunable heterodyning oscillator at a frequency of 455 kc. above the resonant frequency of the circuits of the radio frequency amplifier stages, and, as shown diagrammatically in Fig. 12, the radio frequency circuit and the heterodyne operator are gang-tuned so that they tune together over the entire tuning range. Thus, in tuning into a transmitted signal of 1000 kc., at the start of the tuning operation the radio frequency circuits of the receiver might be resonant at a frequency of 500 kc. in which event the transmitted signal would not be received. At this time, the heterodyning oscillator would be operating at a frequency of 955 kc. As the tuning means are operated to bring the radio frequency circuits toward resonance at 1000 kc., the operating frequency of the heterodyning oscillator is also changed, and at some particular point in the tuning operation depending upon the sensitivity and selectivity of the receiver, the transmitted signal will be accepted by the radio frequency circuits. This first acceptance of the signal might occur when the radio frequency circuits are resonant at 900 kc., in which event the heterodyning oscillator would be operating at 1355 kc. However, since the transmitted signal frequency remains unchanged, the heterodyning action would result in a frequency of 355 kc. (the difference between the signal frequency and the oscillator frequency) being presented to the intermediate frequency amplifier. As the radio frequency circuits are brought closer to resonance with the incoming signal, the intermediate frequency is increased until, at the point where the receiver is correctly tuned the intermediate frequency is 455 kc. Now, if the receiver is detuned on the other side of the signal frequency, the intermediate frequency will continue to rise so long as the transmitted signal is accepted by the radio frequency circuits since as the receiver is tuned away from the receiver in the direction of higher frequencies, the heterodyning oscillator frequency continues to rise so that the difference between the heterodyning oscillator frequency and the transmitter signal frequency becomes greater.

In the apparatus shown diagrammatically in Fig. 1, the converted signal from the intermediate frequency amplifier 20 is divided into two portions. One of these portions is fed to another intermediate frequency amplifier 21, and the output of this amplifier is fed to a detector 22 in which the audio frequency modulation or intelligence is separated from the high frequency carrier wave. The other portion of the output from the intermediate frequency amplifier 20 is fed to an amplifier and discriminator 23 wherein frequency differences between the signal voltage and a mean or center frequency are converted into amplitude variations. These amplitude variations are utilized to control a relay amplifier 24 which in turn controls a relay 25. The contacts 25*a* of the relay comprise a single pole double-throw switch, the movable contact of which is coupled to the output circuit of the detector 22. One of the stationary contacts of the relay is connected to an upper sideband rejector 26 and the other of the stationary contacts of the relay is connected to a lower sideband rejector 27. The output side of each of these rejector arrangements feeds the audio output circuit of the receiver, which is not shown here but which may comprise one or more stages of audio amplification and an indicating means such as a speaker, headset, etc.

In Fig. 2, the apparatus of Fig. 1 is shown schematically. The intermediate frequency amplifier 20 is of conventional construction and has a tuned output circuit comprising the parallel combination of a condenser 28 and an inductance 29 which forms the primary of a coupling transformer. As is understood in the art the output circuit comprising the condenser 28 and the inductance 29 is resonant at the desired intermediate frequency (455 kc. in the example given) and is constructed to pass a desired band width of frequencies sufficient to contain both sidebands associated with the received signal (normally 5000 cycles on each side of the signal). The band of frequencies which this tank circuit will pass is limited to obtain the desired selectivity of the receiver.

A tuned input circuit comprising a condenser 30 and an inductance 31 which forms the secondary of the above-mentioned coupling transformer is coupled to the output circuit of the intermediate frequency amplifier. As is well understood in the art, both of the above described circuits normally are arranged to be resonant at a fixed frequency, although said circuits may be made tunable over a small range, as by means of trimmer condensers (not shown), in order to permit initial adjustment of the receiver.

One side of the input circuit comprising the condenser 30 and the inductance 31 is connected to ground and the other side of the circuit is divided into two channels so that the signal presented is divided into two portions. One of these portions is fed to the control grid of an amplifying tube 32 which may be of tube type No. 6SK7. The cathode of this tube is connected to ground through a cathode resistor 33 which may have a value of 500 ohms and which is by-passed by a condensor 34 which may have a value of .1 microfarad. The suppressor grid of the tube is connected to the cathode as is conventional, and the screen grid and plate of the tube are connected to a source 35 of B+ voltage, the screen circuit including a screen resistor 36 which may have a value of 100,000 ohms and a by-pass condenser 37 which may have a value of .1 microfarad and the other side of which is connected to ground. The plate circuit includes a tuned output circuit 38 comprising the parallel combination of a condenser 39 and an inductance 40. The inductance 40 comprises the primary of a coupling transformer, and the output circuit 38 is similar to the intermediate frequency output circuit earlier described, being resonant at the intermediate frequency and being designed to pass a band width of frequencies wide enough to include the upper and lower sidebands associated with the signal but narrow enough to limit the selectivity of the receiver as desired. A plate resistor 41, which may have a value of 5,000 ohms, and a by-pass condenser 42, which may have a value of .1 microfarad complete the plate supply circuit.

The output of the amplifier stage 21 is coupled to an infinite impedance detector which comprises a triode tube 43 which may be a tube type No. 6J5, the control grid of which is connected to a tuned input circuit 44 comprising a condenser 45 and an inductance 46 which comprises the secondary of the last-mentioned coupling transformer. The plate of the tube 43 is connected to the B+ supply 35 through a plate resistor 47 which may have a value of 10,000 ohms, the alternating frequency components in the plate circuit being by-passed to ground through a condenser 48 which may have a value of .01 microfarad.

The cathode or output circuit of the detector includes an inductance 50 and an output impedance comprising a resistor 51 which may have a value of 50,000 ohms and a resistor 52 which may have a value of 100,000 ohms, the resistor 52 being connected in series with the resistor 51 and the lower end of this impedance arrangement being connected to ground. Both resistors of the impedance arrangement are by-passed by a radio frequency by-pass condenser 53 which may have a value of 100 micromicrofarads. The audio output circuit is coupled to the midpoint between the resistors 51 and 52 by means of a coupling condenser 54 which may have a value of .005 microfarad.

The inductance 50 comprises one portion of filter means for separating the upper sideband associated with the received signal from the lower sideband associated with said signal, and since the filter means have a sharp response characteristic in order to distinguish between the two adjoining sidebands, the inductance 50 is constructed to have a high ratio of reactance to resistance or Q. One end of this inductance is connected to the movable one of the contacts 25a of the relay 25. A condenser 55 is connected between the other end of the inductance 50 and one of the stationary contacts 25a of the relay 25, and a condenser 56 is connected between said other end of the inductance 50 and the other of the stationary contacts 25a of the relay 25 so that one or the other of the condensers 55 and 56 is connected in parallel with the inductance 50, at all times, the condenser 56 being so connected when the relay 25 is energized and the condenser 55 being so connected when the relay is released. The electrical values of the inductance 50 and the condenser 55 are such that the anti-resonant circuit comprising said inductance and condenser is tuned to a frequency above the signal frequency and acts in a manner well understood in the art to reject frequencies above the signal frequency, these rejected frequencies including the upper sideband.

When the relay 25 is energized, the condenser 55 is disconnected from the rejected circuit and the condenser 56 is connected in parallel with the inductance 50, the values of this anti-resonant circuit being such that the circuit acts as a filter to reject frequencies below the frequency of the signal so that the lower sideband associated with the signal is rejected.

While the condensers 55 and 56 are shown as being variable, it will be understood that the capacitance of the condensers is actually fixed in operation although the condensers preferably are made variable in order to set the operating characteristics of each sideband rejector filter at the proper value to reject the respective sidebands. It will be seen that at all times one sideband will be rejected and only a single sideband will reach the output circuit.

Another portion of the converted output signal from the intermediate frequency amplifier 20 is fed to the control grid of an amplifier tube 60. This tube may be of tube type No. 6SK7, and its circuit arrangements are similar to the circuits associated with the amplifier tube 32, the cathode 60 being connected to ground through a cathode resistor 61 which may have a value of 500 ohms and which is by-passed by a condenser which may have a value of .1 microfarad. The screen grid of the tube 60 is connected to a source 35a of B+ voltage (which may in practice, of course, be identical with the source 35 but which is here shown as a separate source in order to simplify the drawing), through a screen resistor 63 which may have a value of 100,000 ohms and which is by-passed by a condenser 64 which may have a value of .1 microfarad; and the plate of the tube 60 is connected to the source 35a of B+ voltage, this circuit including a tuned circuit 65 including a condenser 66 and an inductance 67 in parallel, a plate resistor 68 which may have a value of 5,000 ohms, and a by-pass condenser 69 which may have a value of .1 microfarad.

The tuned output circuit 65 is similar in electrical construction to the circuit 38 and is coupled to an input circuit 70 of a frequency discriminator which converts frequencies which differ from its resonant point to voltage amplitude variations. While the frequency discriminator may be of any conventional type, the particular discriminator illustrated in Fig. 2 comprises a tuned input circuit 70 which is tuned approximately to the signal frequency; two diodes which are illustrated as being contained in one envelope 71, as in a type No. 6H6 tube; an output circuit comprising a condensor 72 which is connected between the cathodes of the diodes and which may have a value of 100 micromicrofarads and a pair of resistors 73 and 74 which are series connected between the cathodes of the two diodes and which each may have a value of 100,000 ohms; and a circuit connecting the electrical center of the respective output circuit to the electrical center of the tuned input circuit, said connecting circuit including a resistor 75 which may have a value of 75,000 ohms. A condenser 76 connects the upper end (in an electrical sense) of the output circuit 65 with the electrical center of the discriminator input circuit 70.

A frequency discriminator operates to convert frequencies which are presented to its input and which differ from a predetermined frequency (the resonant frequency of the input circuit in the particular discriminator illustrated) into amplitude variations in its output circuit. In the particular circuit shown in Fig. 2, the input circuit 70 is tuned approximately to the frequency of the intermediate frequency or converted signal voltage, or 455 kc. in the example given, although this discriminator input circuit may be slightly detuned from the frequency of the signal voltage as will be explained in the description of the operation of the circuit of Fig. 4.

When a frequency equal to the frequency to which the discriminator input circuit is tuned is presented to the input circuit, the phase relationships are such that each half of the diode 71 is caused to conduct equally, and the total voltage across resistors 73 and 74 in the output circuit is zero since the voltage across each resistor is equal and opposed to the voltage across the other resistor. When a frequency higher than the frequency to which the input is tuned is presented to the input, the phase relationships are such that the diodes no longer conduct equally, and a negative voltage appears across resistors 73 and 74 in the output circuit as shown graphically in Fig. 9, which represents a voltage versus frequency curve of a frequency discriminator of the type illustrated here. Conversely, when a frequency lower than the frequency to which the input circuit is tuned is presented to the input, a positive voltage appears across resistors 73 and 74 in the output circuit.

The output of the frequency discriminator is used to control the operation of a relay amplifier tube 80 which may be of tube type No. 6V6 connected as a triode, the control grid of said tube being directly connected to the output circuit of the discriminator. The flow of the plate current through the tube 80 may be adjusted by a variable resistor 81 in the cathode circuit, the movable tap of said resistor being connected to ground; and the plate of the tube 80 is connected through the coil of the relay 25 to the B+ source 35.

Since the operation of the circuit shown in Fig. 2 is similar to the operation of the circuit shown in Fig. 4, this operation will be explained in connection with Fig. 4.

The embodiment of my invention illustrated in Figs. 3 and 4 differs from the embodiment of Figs. 1 and 2 principally in that the sidebands are separated at the output of the intermediate frequency amplifier and each sideband is separately amplified and detected. In other words, the filter for separating the sidebands is on the input side of the detector circuits rather than in the output circuit of the detector. In order to simplify the description, reference characters 100 higher than used in Figs. 1 and 2 are used to designate similar parts in Figs. 3 and 4.

Referring now to Fig. 3, a portion of the output of the intermediate frequency amplifier 120 is delivered to an upper sideband pass filter and amplifier, 82, and the output of this filter and amplifier, comprising only the upper sideband associated with the converted signal, is detected or demodulated in a conventional manner by a detector 83. Another portion of the signal output of the intermediate frequency amplifier is delivered to a lower sideband pass filter and amplifier 84, and the output of this filter and amplifier, comprising only the lower sideband associated with the converted signal, is demodulated in a conventional manner by a detector 85. A third portion of the intermediate frequency amplifier signal output is delivered to an amplifier and discriminator 123 which is similar in structure and operation to the amplifier and discriminator 23 and the output of which is utilized to control a relay amplifier 124, which is similar in construction and operation to the amplifier 24 and which controls the operation of a relay 125. The contacts 125*a* of this relay comprise a single pole double-throw switch, the movable contact of which is coupled to the audio output circuit and the stationary contacts of which are respectively coupled to the detectors 83 and 85.

Referring now more particularly to Fig. 4, only the tuned output circuit of the intermediate frequency amplifier 120 is illustrated, this circuit comprising a condenser 128 and inductance 129. This output circuit, as in Fig. 2, is coupled to a tuned input circuit comprising a condenser 130 and an inductance 131. A portion of the signal voltage from the tuned input circuit is delivered to the upper sideband pass filter and amplifier 82. Inasmuch as this filter and amplifier may be of conventional construction well known to the art, its detailed electrical construction is not shown here.

The filter and amplifier is constructed to have a response curve similar to that shown graphically in Fig. 5 in which the axis of ordinates represents decibels and the axis of abscissas represents frequency in kilocycles. From Fig. 5 it may be seen that the filter and amplifier 82 is designed to pass approximately 4 kilocycles above the center frequency (which would be 455 kc. in the example given) and to drop off very sharply on either side of this 4 kc. band. As shown by the curve 86 in Fig. 5, a signal approximately 500 cycles lower in frequency than the center frequency is attenuated approximately 20 db, and a signal approximately 1 kc. lower in frequency than the center frequency is attenuated approximately 50 db. A filter and amplifier constructed to have a response curve similar to the curve 86 will, therefore, pass only the upper sideband of approximately 4 kc. After separation from the lower sideband and amplification, the upper sideband is demodulated by the detector 83 which may take any conventional form.

The lower sideband pass filter and amplifier 84 to which another portion of the signal voltage from the intermediate frequency amplifier is delivered is similar in construction and operation to the filter and amplifier 82 except that the filter and amplifier 84 is designed to pass only the lower sideband associated with the signal voltage. The curve 87 in Fig. 6 shows graphically the response of the lower sideband filter and amplifier 84. As may be seen in Fig. 6 the unit 84 is designed to pass a band of frequencies extending from the center frequency to about 4 kilocycles below the center frequency, and frequencies approximately 500 cycles higher than the center frequencies are attenuated approximately 20 db, while frequencies approximately 1 kc. higher than the center frequency are attenuated approximately 50 db. After separation and amplification the lower sideband is demodulated in the detector 85 which may be similar to the detector 83.

A third portion of the output signal from the intermediate frequency amplifier 120 is delivered to a circuit similar to the amplifier, discriminator and relay amplifier of Fig. 2. This circuit comprises an amplifier tube 132 having its cathode connected to ground through a resistor 133 which is by-passed by a condenser 134, and having its plate and screen connected to a source 135$a$ of B+ voltage. The screen circuit includes a resistor 163 which is by-passed by a condenser 164; and the plate circuit includes a tuned output circuit 165 comprising a condenser 166 and an inductance 167, a plate voltage dropping resistor 168 and a by-pass condenser 169.

The discriminator comprises a tuned input circuit 170 connected to the respective plates of two diodes which are contained within the single envelope 171. A condenser 172 is connected between the cathodes of the diodes, and the discriminator output circuit comprises resistors 173 and 174 connected in series between the diode cathodes. Resistor 175 is in a circuit connecting the electrical center of the output circuit with the electrical center of the input circuit, and a condenser 176 couples the high side of the amplifier output circuit 165 to the electrical center of the discriminator input circuit 170.

A relay amplifier tube 180 has its control grid connected to the discriminator output circuit, its cathode connected to ground through the variable resistance 181, and its plate connected to the B+ source 135 through the operating coil of the relay 125. The tubes used in the circuit just above described may be similar to the tubes used in the circuit of Fig. 2, and the value of the electrical components of the circuit of Fig. 4 may be identical with the value of the electrical components of the circuit of Fig. 2.

In the circuits of Fig. 2 and Fig. 4, only a single sideband is used for radio reception and switching between the sidebands to select one or the other of said sidebands occurs as a function of the operation of the radio receiver tuning means. As pointed out earlier in this description the frequency of the converted signal voltage which appears in the intermediate frequency amplifier 20 varies as a function of the operation of the tuning means. These variations in frequency are converted into amplitude variations by the frequency discriminator. As appears from Fig. 9, a frequency higher than the desired carrier frequency—i. e. a frequency higher than 455 kc. in the example given—produces a negative voltage at the output of the discriminator.

As is well understood in the art, a negative voltage on the control grid of a tube reduces the flow of plate current through the tube so that the relay 25, which is arranged to be energized when no signal voltage is present, is released. With the particular circuit components illustrated the relay may be adjusted to operate with a current of 25 milliamperes and to release when the current falls below 23 milliamperes. The cathode resistor 81 may be adjusted so that the relay is just held in operation in the absence of any actuating voltage from the output of the discriminator. The movable contact of the relay is spring biased to release position, and when the relay is energized the audio output is obtained from the upper sideband associated with the signal. In the apparatus of Figs. 1 and 2 the lower sideband rejector filter is connected into the circuit when the relay is energized so that only the upper sideband passes to the audio output circuit, and in Figs. 3 and 4 when the relay is energized the upper sideband amplifier and detector are connected to the audio output circuit. When the relay is released the lower sideband is used for reception.

Fig. 7 illustrates the apparent selectivity response of a radio receiver constructed in accordance with this invention and Fig. 8 shows this apparent selectivity response in greater detail. It will be seen from the above discussion that no matter in which direction the receiver is tuned toward the transmitted signal, the intelligence will be received from the sideband on the opposite side of the signal. This is true whether the tuning is from frequencies higher than the transmitted signal or from frequencies lower than the transmitted signal. In Figs. 7 and 8 it will be seen that the filtering or separation of the sidebands is imperfect and the sidebands overlap near the signal or center frequency.

If a signal is being tuned in from the high frequency side of the transmitted signal, the upper sideband circuit is connected to the audio output circuit since this is a normal no-signal condition. However, as the resonant frequency point of the radio frequency circuits of the receiver approaches the frequency of the transmitted signal a signal higher in frequency than the center or desired frequency will appear in the intermediate frequency amplifier and the frequency discriminator will convert this higher frequency to a negative voltage so that plate current in the relay amplifier tube will be reduced and the relay will be released, the movable contact of the relay moving to the position other than that shown in the drawing, switching in the lower sideband and disconnecting the upper sideband. The apparent selectivity as the receiver approaches its correct tuning will look like the curve 87 in Figs. 7 and 8. As the tuning approaches its correct point the circuit is so arranged that at some point between 87$a$ and 87$b$ the negative bias supplied by the frequency discriminator will drop sufficiently and plate current in the relay amplifier tube will increase so that the relay will again become energized, switching the operation of the system back to the upper sideband. This is obvious when it is considered that the more closely the frequency of the I. F. amplifier output approaches the frequency to which the input circuit of the discriminator is tuned, the lower the output voltage of the discriminator becomes. Continued tuning from a higher frequency toward a lower frequency will now be made on the upper sideband frequency response curve 86. In other words, the apparent selectivity is the selectivity of the cut-off side of each filtered sideband, and this cut-off side is very steep so that the receiver has a very narrow apparent selectivity.

In the event tuning towards the transmitted signal starts from a frequency lower than the frequency of the transmitted signal, the upper sideband is first switched in since this is the normal condition of the system. As the tuning means are operated to approach correct tuning, at some point between 86*a* and 86*b* on the upper sideband response curve the frequency supplied to the discriminator will be sufficiently higher than the frequency to which the discriminator input circuit is tuned to produce enough negative voltage to release the relay, causing a switch over to the lower sideband. When this takes place the amplitude of the receiver signal will drop approximately 2 db to point 87*a* on the curve 87 of the lower sideband.

As indicated earlier in this disclosure, the center or tuned frequency of the input circuit for the frequency converter preferably is set at a frequency slightly lower than the desired signal frequency, as for example about .25 kc. below the signal frequency as indicated at 88 in Fig. 8. This is done so that the sideband switching will take place in an area near the signal frequency so that there will be a minimum of amplitude change in the received signal as the sidebands are switched in and out of the circuit.

Fig. 10 represents a modified arrangement incorporating a reversing switch to reverse the connections of the relay to give a different apparent selectivity. A relay amplifier tube 280 has a control grid which is connected to the output of a discriminator as in Fig. 4. The cathode of the tube 280 is connected to ground through a variable resistance 281 and the plate is connected to a B+ supply 235 through the coil of a relay 125 having contacts in the form of a single pole double-throw switch as in Fig. 4. The movable relay contact is connected to the audio output circuit of the receiver, and the stationary contacts of the relay are respectively connected to the movable contacts of a double pole double-throw reversing switch 89. A lead 89*a* connects one pair of stationary contacts of the switch 89 to the upper sideband circuits and a lead 89*b* connects the other pair of stationary contacts of the switch 89 to the lower sideband circuits. With the relay 125 energized as illustrated and the reversing switch in the position shown, the upper sideband circuits would be connected to the audio ouput circuit and the operation would be similar to Figs. 2 and 4. However, if the switch 89 were moved to the position other than that shown in the drawings, when the relay 125 is energized the lower sideband circuits would be connected to the audio output circuit, and in the event that the relay 125 were released the upper sideband circuits would be connected to the audio ouput circuit.

The switch 89 is preferably manually operated and when said switch is in the position other than that shown in the drawings the apparent selectivity is no longer very narrow as shown in Figs. 7 and 8, but is relatively broad as shown in Fig. 11 and is comparable to the relatively broad selectivity of a double sideband receiver. This will be obvious when it is considered that if the tuning is approached from frequencies lower than the transmitted signal the lower sideband will be switched into the circuit and reception will follow the lower sideband response curve 87 of Fig. 11. Conversely when correct tuning is approached from frequencies higher than the frequency of the transmitted signal the upper sideband will be switched into the receiver and reception will follow the curve 86 of the upper sideband as shown in Fig. 11. This broad apparent selectivity has the advantage of making the tuning action seem the same as the tuning action of a double sideband receiver and the switching action from one sideband to the other is not apparent to the operator.

Furthermore, it will be apparent from a consideration of Fig. 11 that the actual selectivity of the receiver is comparable to the relatively broad selectivity of a double sideband receiver since, while reception of only one sideband is had at any one time, the sequential switching between sidebands as the operator tunes through a band pass range results in a total response curve similar to the response curve of a double sideband receiver.

Although the broad apparent selectivity tuning position still results in single sideband reception and is advantageous for operation by relatively unskilled persons, the sharp or narrow apparent selectivity of arrangement of Figs. 2 and 4 is preferable inasmuch as reception is more free from noise and other interference outside the relatively narrow switching area. Furthermore, in the presence of a strong interfering signal close in frequency to the desired signal, the frequency discriminator will automatically cause selection of the sideband which is free of the interfering signal when the interference signal frequency is higher than the frequency of the desired signal and when the sideband in use at the time happens to be the upper sideband as is normally the case. This action will not take place if the switch 89 is operated to give broad tuning; and in fact in such position the frequency discriminator will try to select the sideband which contains the interfering signal.

Fig. 12 illustrates a different type of circuit in which selective sideband switching is accomplished as a function of the operation of the tuning means.

In Fig. 12 a conventional superheterodyne arrangement is shown, it being understood that the intermediate frequency amplifiers of Figs. 1 and 3 are also preceded by such an arrangement. In Fig. 12 an antenna 90 is adapted to receive a transmitted signal and couple such signal to a tunable radio frequency stage 91 which conventionally comprises one or more amplifying tubes and their associated circuits. A heterodyning oscillator 92 is also supplied, and tuning means 93 are utilized to tune the radio frequency circuits and the oscillator 92. As is conventional, the tuning of the radio frequency circuits and the oscillator is ganged so that the oscillator always operates at the predetermined frequency above the resonant frequency of the radio frequency circuits.

The amplified transmitted signal and the oscillator output are fed to a mixer 93 which produces a plurality of different frequencies including frequencies equal to the sum of the two mixed frequencies and frequencies equal to the difference between said two frequencies. One of these converted frequencies, preferably the difference frequency, is delivered to an intermediate frequency amplifier 320 which is similar to the intermediate frequency amplifiers 20 and 120 of Figs. 1 and 3.

As in the apparatus of Fig. 3 a portion of the intermediate frequency amplifier converted signal output is delivered to an upper sideband pass filter and amplifier 382 having a tuned output circuit 382*a*, and another portion of the intermediate frequency amplifier converted signal output is delivered to a lower sideband pass filter and amplifier 384 having a tuned output circuit 384a. A double acting detector circuit is coupled to the output circuits 382a and 384a, this detector circuit comprising a first input circuit 94 connected to a first diode 95 which may be of tube type No. 6H6 and a second tuned input circuit 96 coupled to a second diode 97 which may be of tube type No. 6H6. The other end of each of the tuned input circuits 94 and 96 are connected to a resistor 98 which may have a value of 250,000 ohms and which is by-passed by a condenser 99. One end of the resistor 98 is connected to ground and to the cathode of each of the diodes 95 and 97, and the other end of the resistor 98 is coupled to the receiver audio output circuit by means of a coupling condenser 100.

This detector circuit acts in the manner of a switch and is somewhat similar to detector circuits employed in diversity receivers wherein the two diodes of the detector arrangement are connected to two receivers, and the receiver having the greater signal biases the diode connected to the receiver having the weaker signal to cut-off the audio output from said diode. In the circuit shown in Fig. 12, however, at the carrier frequency the signal is always equal in both diodes as may be seen in Fig. 8. However, when one or the other sidebands is selected as a function of the operation of the tuning means, the diode handling the rejected sideband will conduct less than the diode handling the selected sideband and the last mentioned diode will place a positive bias on the cathode of the first mentioned or weaker diode and stop conduction by said diode. The circuit illustrated in Fig. 12 is of simpler and more economical construction than are the circuits of Figs. 1 and 3, but I have found that said circuit is not as critical in its action as are the other circuits illustrated.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Single sideband radio apparatus of the character described, including: a first circuit, including tuning means, for providing a signal which varies in frequency as a function of the operation of said tuning means and which has upper and lower sidebands; and a second circuit coupled to said first circuit for determining the selection of one of said sidebands by, and as a function of, the operation of said tuning means, said last mentioned circuit including two sideband selecting differently tuned band-pass circuit portions and apparatus for converting frequency variations into voltage amplitude variations providing a substantially straight line sloping frequency against voltage characteristic curve throughout a frequency band from substantially the mid-frequency of one sideband selector band-pass circuit to substantially the mid-frequency of the other and going through zero substantially midway therebetween and a switch operated by variations in amplitude of said voltage for switching between said sideband selecting circuit portions.

2. Single sideband radio apparatus of the character described, including: a first circuit, including a tunable oscillator and a mixer for providing a signal which varies in frequency as a function of the operation of said tuning means and which has upper and lower sidebands associated therewith; and a second circuit coupled to said first circuit for determining the selection of one of said side bands by, and as a function of, the operation of said tuning means, said last mentioned circuit including two sideband selecting differently tuned band-pass circuit portions, a frequency discriminator for converting frequencies which vary from a predetermined frequency into voltage amplitude variations, said frequency discriminator providing a substantially straight line sloping frequency against voltage characteristic curve throughout a frequency band from at least one-third of the way within one side band selector band-pass circuit, to at least one-third of the way within the other side band selector band-pass circuit and going through zero substantially midway therebetween, a tube controlled by the amplitude of said voltage and a switch controlled by said tube for switching between said sideband selecting circuit portions.

JAMES L. A. McLAUGHLIN.

References Cited in the file of this patent

UNITED STATES PATENTS

| Number | Name | Date |
|---|---|---|
| 2,054,412 | Farrington | Sept. 15, 1936 |
| 2,088,203 | Hansell | July 27, 1937 |
| 2,169,830 | Case | Aug. 15, 1939 |
| 2,186,146 | Plebanski | Jan. 9, 1940 |
| 2,255,050 | Farrington | Sept. 9, 1941 |
| 2,273,023 | De Bellescize | Feb. 17, 1942 |
| 2,364,863 | McLaughlin | Dec. 12, 1944 |
| 2,480,870 | McLaughlin | Sept. 6, 1949 |

FOREIGN PATENTS

| Number | Country | Date |
|---|---|---|
| 536,041 | Great Britain | Apr. 30, 1941 |